US011975504B2

(12) United States Patent
Kannankeril et al.

(10) Patent No.: US 11,975,504 B2
(45) Date of Patent: May 7, 2024

(54) INFLATABLE ON-DEMAND MAILER POUCHES AND ASSOCIATED METHODS

(71) Applicant: Sealed Air Corporation (US), Charlotte, NC (US)

(72) Inventors: Charles Kannankeril, North Caldwell, NJ (US); Joseph E. Owensby, Spartanburg, SC (US); Andrew W. Moehlenbrock, Simpsonville, SC (US); Howard Dean Conner, Mauldin, SC (US); Laurence B. Sperry, Newton, MA (US)

(73) Assignee: Sealed Air Corporation (US), Charlotte, NC (US)

( * ) Notice: Subject to any disclaimer, the term of this patent is extended or adjusted under 35 U.S.C. 154(b) by 968 days.

(21) Appl. No.: 16/960,356

(22) PCT Filed: Jan. 10, 2019

(86) PCT No.: PCT/US2019/013013
§ 371 (c)(1),
(2) Date: Jul. 7, 2020

(87) PCT Pub. No.: WO2019/140065
PCT Pub. Date: Jul. 18, 2019

(65) Prior Publication Data

US 2021/0060889 A1 Mar. 4, 2021

Related U.S. Application Data

(60) Provisional application No. 62/616,674, filed on Jan. 12, 2018.

(51) Int. Cl.
*B31D 5/00* (2017.01)
*B65D 27/14* (2006.01)
*B65D 81/05* (2006.01)

(52) U.S. Cl.
CPC .......... *B31D 5/0073* (2013.01); *B65D 27/14* (2013.01); *B65D 81/052* (2013.01); *B31D 2205/0023* (2013.01)

(58) Field of Classification Search
CPC .... B65D 27/14; B65D 81/052; B31D 5/0073; B31D 2205/0023
(Continued)

(56) References Cited

U.S. PATENT DOCUMENTS 4,564,407 A 1/1986 Tsuruta
5,660,662 A 8/1997 Testone
(Continued)

FOREIGN PATENT DOCUMENTS

DE 202017103768 U1 7/2017
GB 2472388 A 2/2011
(Continued)

*Primary Examiner* — Jes F Pascua
(74) *Attorney, Agent, or Firm* — Jon M. Isaacson

(57) ABSTRACT

Webs of inflatable mailer pouches and associated methods are disclosed. Pouches include a multilayer inner cushion structure with inflatable compartments and a fill channel disposed at a first longitudinal edge of the structure. An outer layer with a closure flap is secured to the inner structure. The inner cushion structure and outer layer are folded at a bottom edge of the pouch to form first and second panels of the pouches. The fill channel may be disposed at a top of the first panel and the closure flap disposed at a top of either the first or the second panel. The fill channel extends beyond a top of the second panel and the closure flap is extendable beyond the top of the fill channel. When wound, the closure flap is folded so that the fill channel of each pouch layer is exposed at a lateral face of the cylinder.

19 Claims, 13 Drawing Sheets

(58) Field of Classification Search
USPC .............................................................. 383/3
See application file for complete search history.

(56) References Cited

U.S. PATENT DOCUMENTS

| | | | | |
|---|---|---|---|---|
| 6,423,166 | B1 | 7/2002 | Simhaee | |
| 8,568,029 | B2 * | 10/2013 | Kannankeril | B65B 55/20<br>383/3 |
| 9,714,128 | B2 * | 7/2017 | Matta | B65D 75/58 |
| 9,969,136 | B2 * | 5/2018 | Lepine | B29D 22/02 |
| 10,786,960 | B2 * | 9/2020 | Sperry | B65D 81/03 |
| 2005/0013974 | A1 * | 1/2005 | Koyanagi | B32B 3/28<br>428/178 |
| 2010/0281831 | A1 * | 11/2010 | Kannankeril | B31D 5/0073<br>53/512 |
| 2011/0192121 | A1 | 8/2011 | Kannankeril et al. | |
| 2014/0260094 | A1 | 9/2014 | Wehrmann | |
| 2014/0314978 | A1 | 10/2014 | Lepine et al. | |
| 2019/0276216 | A1 * | 9/2019 | O'Dowd | B31D 5/0073 |

FOREIGN PATENT DOCUMENTS

| | | | |
|---|---|---|---|
| JP | 2626879 | B2 * | 7/1997 |
| JP | 2016520449 | A * | 7/2016 |
| WO | 2017112773 | A1 | 6/2017 |
| WO | 2017132354 | A1 | 8/2017 |

* cited by examiner

INFLATABLE ON-DEMAND MAILER POUCHES AND ASSOCIATED METHODS

TECHNICAL FIELD

The presently disclosed subject matter relates generally to inflatable on-demand mailer pouches usable in mailing, shipping, or other transportation and particularly to advancements in the manufacturing of such pouches to provide stock supplies of pouches that are easily filled on-site.

BACKGROUND

Pouches are frequently used as containers for shipping or mailing. Pouches are capable of holding a variety of types and shapes of objects, such as documents, electronics, clothing, or any other type of object. Some pouches are formed from a skin with multiple layers. The layers include a cushion layer, such as a foam layer, a layer of inflated cells, or other cushioning, covered by an exterior layer, such as an opaque plastic film, kraft paper, or any other protective material. The cushion layer serves to protect any objects placed inside the pouch from impact damage, while the exterior layer prevents dirt and debris from entering the pouch, prevents any objects inside the pouch from being viewed, and permits a label to be attached, written, and/or printed onto the pouch. In some instances, it may be desirable to provide a supply of inflatable pouches that are easily filled by existing packaging equipment.

SUMMARY

Embodiments of the presently disclosed subject matter are directed towards a cylinder roll of preformed mailer pouches comprising wound pouch layers, each pouch layer comprising adjoining individual mailer pouches, each pouch layer comprising an inflatable inner cushion structure that comprises a plurality of layers and a fill channel connected to a plurality of inflatable compartments in the inner cushion structure. The inner cushion structure may be in a deflated state on the roll. The pouches and pouch layers may also comprise an outer layer secured to the inner cushion structure. The outer layer may comprise a closure flap. The inner cushion structure and outer layer may be folded at a bottom edge of the pouch layer to form a first panel of the pouches and a second panel of the pouches, the fill channel being disposed at a top of the first panel. The closure flap may be disposed at a top of either the first or the second panel. In one or more embodiments, the fill channel extends a first distance beyond a top of the second panel and the closure flap is extendable a second distance beyond the top of the fill channel. Also, the closure flap may be folded towards the bottom edge so that the fill channel of each pouch layer is exposed at a lateral face of the cylinder.

In one embodiment, the inflatable inner cushion structure comprises at least one thermoformed layer. In such an embodiment, the outer layer may be secured to the thermoformed layer. In one embodiment, the first and second panels define an opening to a product volume that is disposed between the panels and the fill channel is disposed at the top of the first panel closest to the opening and the closure flap is disposed at the top of the first panel opposite the opening. In one embodiment, the roll may further comprise a plurality of perforated lateral seals securing the first and second panels. The lateral seals may extend from the fold towards the fill channel and define lateral sides of individual mailer pouches. The roll may further comprise an adhesive region to secure the closure flap to an exterior of the mailer pouches. The adhesive region may be disposed on the closure flap. In one embodiment, the cylindricity of an outer surface of the roll is within a predetermined limit.

Other embodiments of the presently disclosed subject matter are directed towards a method of forming a cylinder roll of preformed pouches, the method comprising steps of providing a supply of a film structure comprising a plurality of layers, the film structure further comprising a plurality of inflatable compartments and a fill channel disposed at a first longitudinal edge of the film structure, providing a supply of an outer film, the outer film comprising a closure flap disposed at a first longitudinal edge of the outer film, guiding the film structure and the outer film into contact with each other so that the fill channel is disposed laterally inward from the closure flap. The method may further comprise applying a closure material to the closure flap, folding the film structure and the outer film at a bottom edge to form a first panel comprising the fill channel and the closure flap and a second panel extending from the bottom edge towards but laterally inward of the fill channel, transversely sealing the first panel to the second panel to create a web of individual pouches, folding the closure flap to expose the fill channel and so that the closure flap is disposed laterally inward from the fill channel, and rolling the web of individual pouches into a cylindrical roll with the closure flap folded and with the fill channel disposed at a lateral face of the cylinder.

In one embodiment, the method may further comprise, before the step of folding the film structure and the outer film, temporarily inflating the film structure and heat sealing the outer film to the temporarily inflated film structure by passing the film structure and the outer film between spaced apart nip rollers, at least one of the nip rollers being heated, and then deflating the film structure. In one embodiment, the method may further comprise, after the step of folding the film structure and the outer film, at least partly sealing the outer film to the film structure at a top of the second panel. In one embodiment, the method may further comprise perforating the web of individual pouches at a location where the first panel and the second panel are transversely sealed.

In one embodiment, the film structure may comprise at least one thermoformed layer. In such an embodiment, the step of guiding the film structure and the outer film into contact with each other may comprise guiding the outer layer into contact with the at least one thermoformed layer. In one embodiment, the method may further comprise rolling the web of individual pouches into a cylindrical roll with the closure flap folded and disposed towards an exterior of the cylinder. In one embodiment, the method may further comprise rolling the web of individual pouches into a cylindrical roll characterized by a cylindricity within a predetermined limit.

Other embodiments of the presently disclosed subject matter are directed towards an inflatable mailer pouch comprising an inflatable inner cushion structure comprising a first film layer and a second film layer bonded together at an interface, the first film layer being thermoformed and comprising inflatable compartments that, upon inflating, expand a first height from the interface that is greater than a second height by which the second film expands and an outer film secured to the first thermoformed film layer of the inner cushion structure along two side edges, the outer film comprising a closure flap, wherein the inner cushion structure and outer film are folded at a bottom edge to form first and second panels oriented in a face-to-face relation to define an interior space, and wherein the second film faces the interior space. In one embodiment, the inner cushion structure further comprises a fill channel that is disposed at a top of the first panel, the closure flap also being disposed at the top of the first panel, the closure flap and the fill channel being detached from each other to allow the closure flap to fold away and expose the fill channel. In one embodiment, the outer film may be at least partially sealed to the inner cushion structure at a top of the second panel. In one embodiment, the mailer pouch may further comprise an adhesive region to secure the closure flap to the outer film at an exterior of the mailer pouch.

Various aspects of the subject matter disclosed herein are described with reference to the drawings. For purposes of simplicity, like numerals may be used to refer to like, similar, or corresponding elements of the various drawings. The drawings and detailed description are not intended to limit the claimed subject matter to the particular form disclosed. Rather, the intention is to cover all modifications, equivalents, and alternatives falling within the spirit and scope of the claimed subject matter.

DETAILED DESCRIPTION

The present disclosure describes embodiments of inflatable pouches and webs of inflatable pouches that are easily and effectively inflated, on-demand, at a desired point of use for packaging mailed goods. A continuous web of separable, inflatable pouches can be produced in a first location in the form of a compact roll or fanfold stack. The compact web of inflatable pouches can be shipped in the deflated state, occupying less shipping volume than pre-inflated pouches. The inflatable pouches are then inflated at a second location as needed. An advantage of the embodiments described herein is that the supply of separable, inflatable pouches can be filled on existing systems that are conventionally used to produce inflated webs, for example, inflated protective cushioning material. One such example is illustrated and described in commonly assigned patent publication WO/2017/132354, published Aug. 3, 2017.

Figure 1:
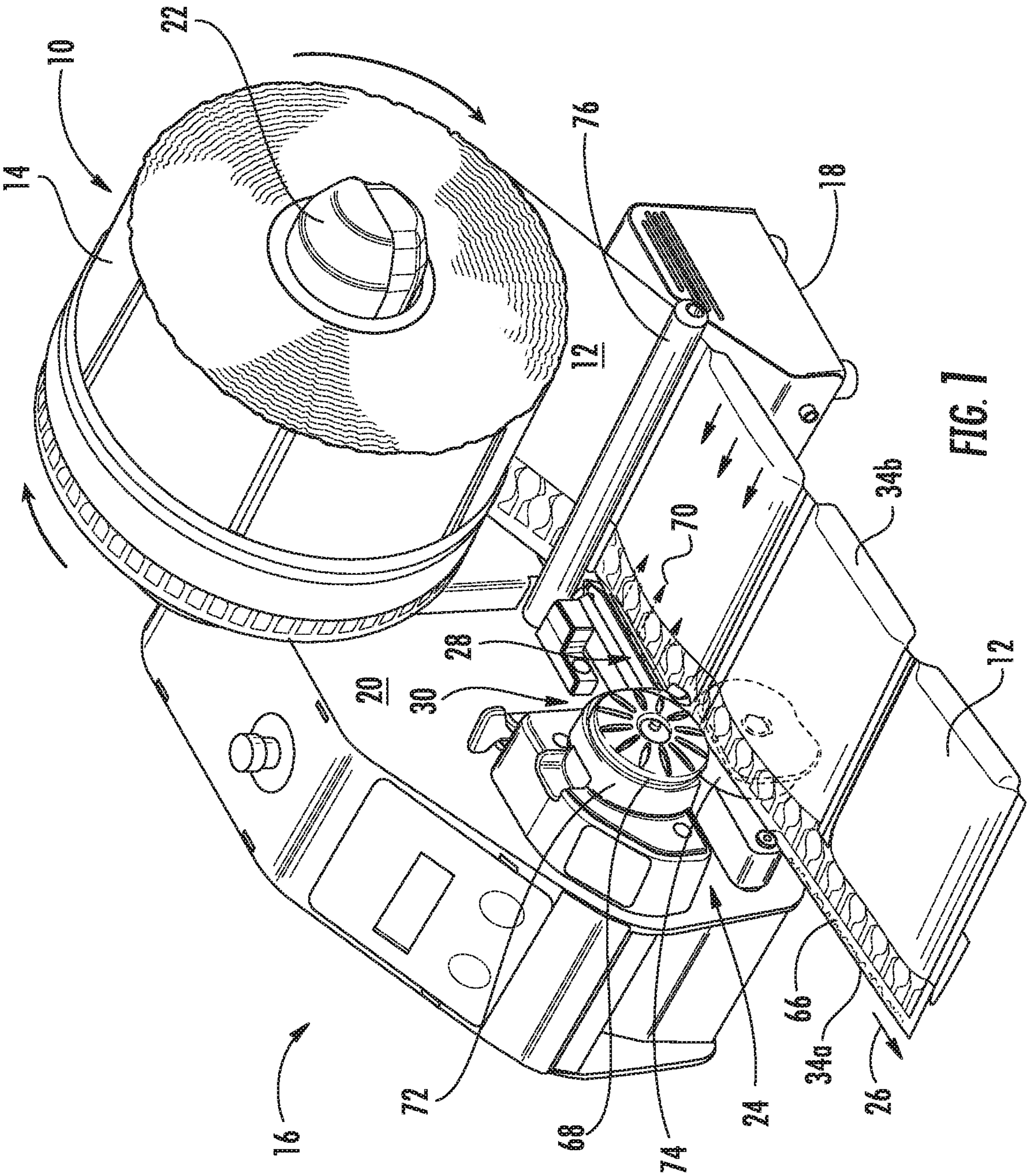
FIG. 1 is a perspective view of a machine for inflating and sealing an inflatable web having a series of inflatable pouches in accordance with some embodiments of the present disclosure.
Figure 2:
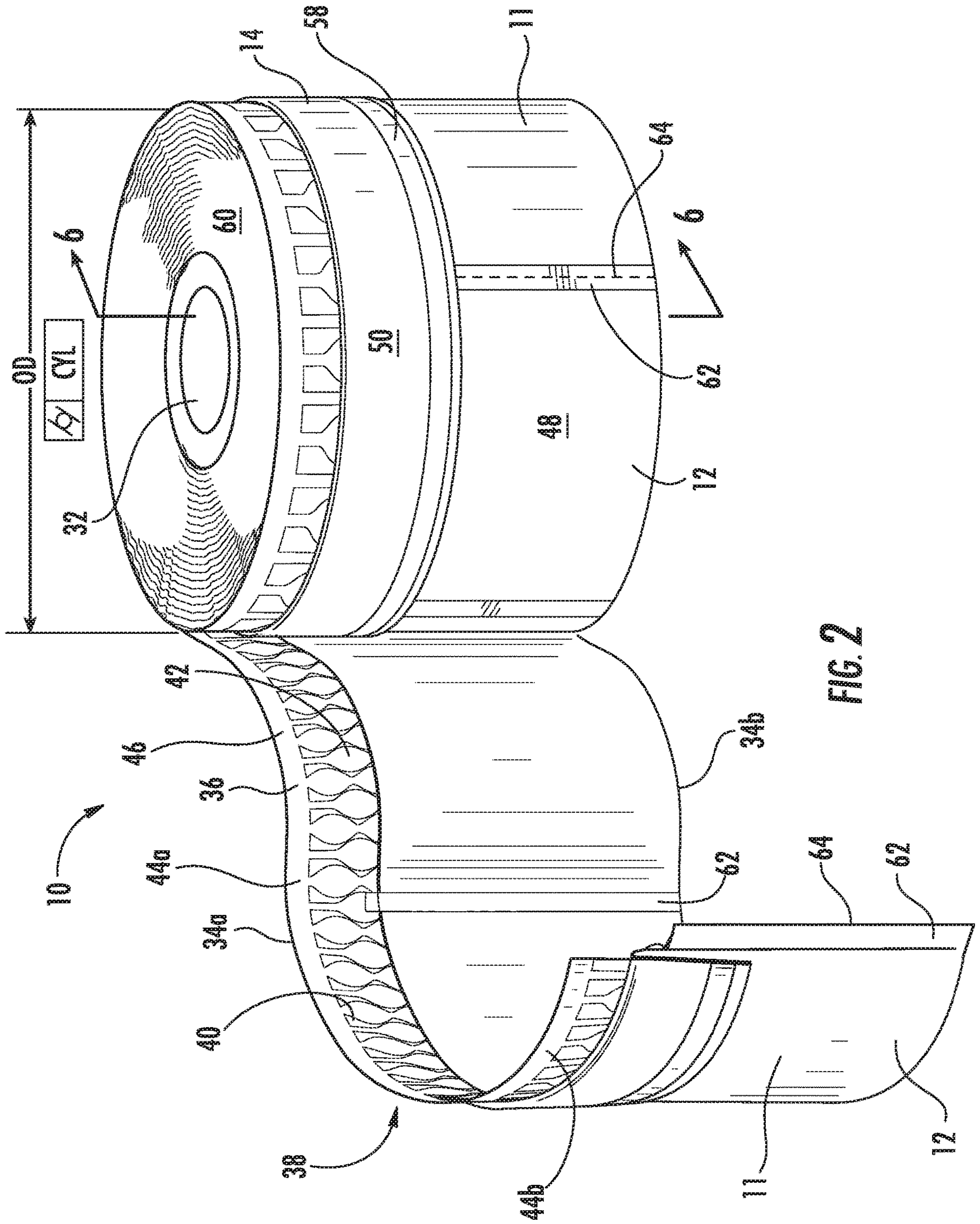
FIG. 2 is a perspective view of a rolled web having a series of inflatable pouches in accordance with some embodiments of the present disclosure.

Referring to FIGS. 1 and 2, an embodiment of a web 10 of separable, inflatable pouches 12 in the form of a roll 14 can be installed on a machine 16 for inflation thereon. The machine 16 includes a support structure 12, which may comprise a base 18 and a wall 20 extending upwards from the base. Machine 16 further includes a spool 22 for rotatably supporting a roll 14 of the inflatable web 10, a web conveyance system 24 for conveying the inflatable web 10 along a path of travel 26, an inflation system 28 for inflating the inflatable web 10 (and the pouches 12 therein), and a sealing device 30 located proximate to the inflation system for sealing closed the inflated pouches 12. The machine 16 may further include a tensioner 76 positioned between roll 14 and inflation system 28 to guide and provide frictional resistance to the web 10 in opposition to its advancement along path 26 for controlled production of the inflated pouches 12.

FIG. 2 illustrates one embodiment of a web 10 of inflatable pouches 12 in the form of a roll 14. The roll 14 includes a central hub 32 that can engage the spool 22 of machine 16 in preparation for inflating the pouches 12. Web 10 has wound layers 11 of connected, inflatable pouches 12, each layer 11 having opposing first and second longitudinal edges 34*a, b*. The web 10 and inflatable pouches 12 are constructed of an inflatable inner cushion structure 38 comprising multiple film layers 44*a*, 44*b* that are sealed together with a seal pattern 40 that forms inflation compartments or channels 42 extending transversely in a direction generally from the first longitudinal edge 34*a* towards the second longitudinal edge 34*b*. The seal pattern is spaced from first edge 34*a*, in order to form a pair of opposing open (unattached) flanges in layers 44*a*, 44*b* that form an 'open skirt' region 36. This skirt region 36 provides a fill channel 46, which allows inflation system 28 to inject air between film layers 44*a, b* and inflate the inflation channels 42.

The inner cushion structure 38 may, in general, comprise any flexible film material that can be manipulated by the machines described herein (e.g., machines 16) to enclose a gas or fluid 70 as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from C3 to C20 alpha-olefins, including linear low density polyethylene (LLDPE), linear medium density polyethylene (LMDPE), very low density polyethylene (VLDPE), and ultra-low density polyethylene (ULDPE). Various other polymeric materials may also be used such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known extrusion process by melting the component polymer(s) and extruding, coextruding, or extrusion-coating them through one or more flat or annular dies.

As further illustrated in FIGS. 3 and 4A-4D, the pouches 12 include an outer layer 48 covering the inner cushion structure 38. The outer layer 48 forms an outer skin of the inflatable pouches 12. In some embodiments, the material of film layer 48 includes one or more materials selected from a wide variety of materials known in the art, including (but not limited to) the same materials used in forming the inner cushion structure 38, thermoplastic material, cardboard, paperboard, paper, foil, canvas, cloth, foamed film, and the like. In one embodiment, the film layer 48 is formed from a heat sealable thermoplastic material. In some embodiments, the film layer 48 is opaque to prevent objects within an inflatable pouch 12 from being viewed from the outside of the inflatable pouch. In some embodiments, the film layer 48 may have a color that is different than a color of the inner cushion structure 38. In some embodiments, the film layer 48 may have a material that is different than a material of the inner cushion structure 38, such as the film layer 48 having one of a metalized film layer, a coated film layer, a printed film layer, or an embossed film layer.

Figure 3:
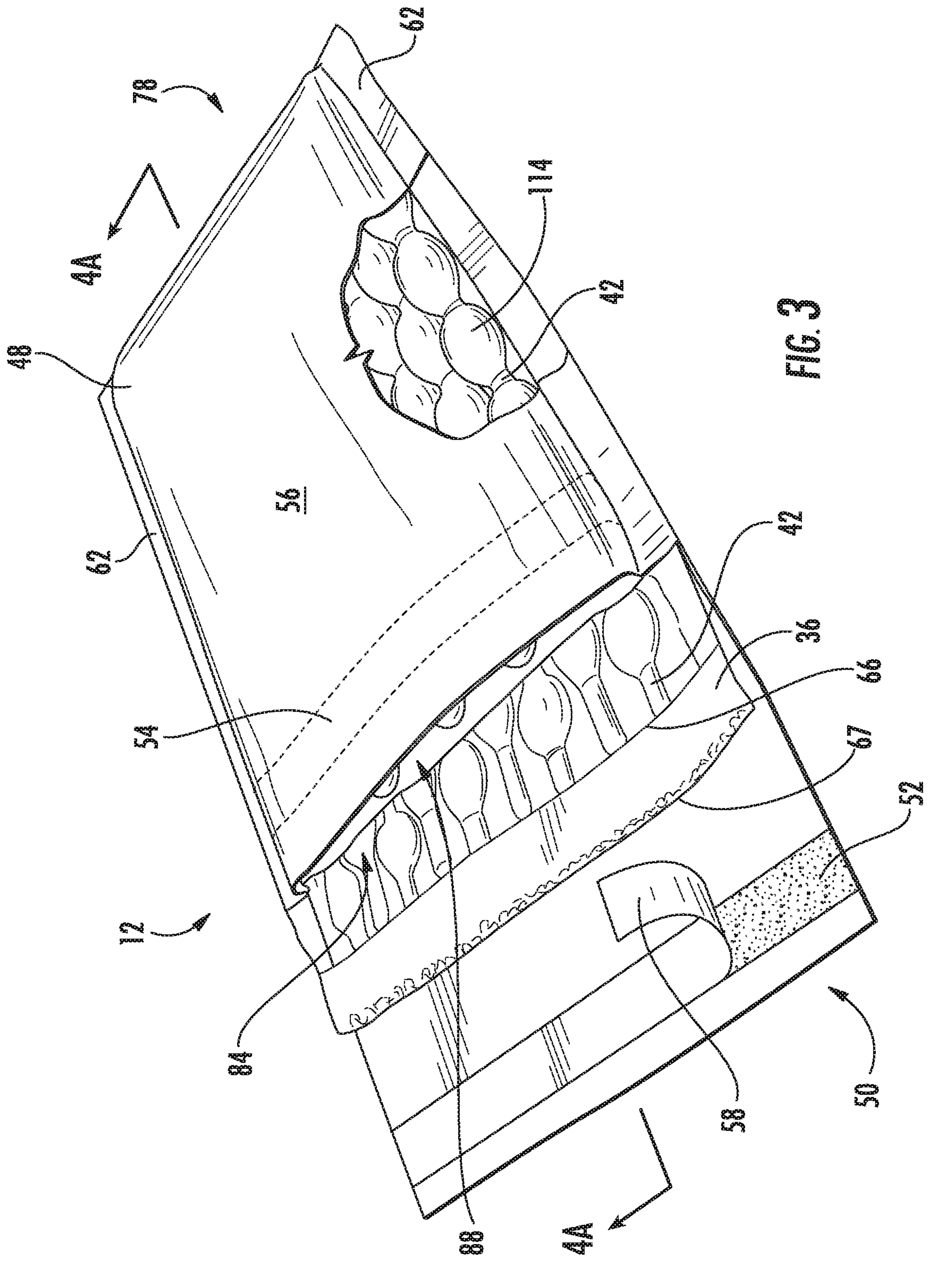
FIG. 3 is a perspective view of a separated, inflated pouch in accordance with some embodiments of the present disclosure.

In the embodiment illustrated in FIGS. 1-3, the pouches 12 are separated by edge seals 62 where the outer layer 48 and inner cushion structure 38 are secured to each other to define a width of the pouches 12. The edge seals 62 may be formed by a process of heat sealing, adhering, ultrasonic bonding, or other techniques known in the art. In one or more embodiments, a perforation 64 or other weakened area can be incorporated into the web 10 to allow end users to easily separate the pouches 12 after they are filled by the machine 16.

The illustrated pouches 12 also include a closure flap 50 for enclosing a package comprising goods or products into the pouch 12 for shipping. In the depicted embodiment, an adhesive region 52 (e.g., an adhesive covered by a releasable liner 58 or other peelable tape segment) is located on an interior side of the closure flap 50. As configured, the releasable liner 58 can be removed to expose the adhesive region 52 and the closure flap 50 folded over the opening 84 of the pouch 12 and secured to a closure region 54 at the exterior 56 of the outer layer 48. In an alternative embodiment, the adhesive region 52 may be positioned at the location where the closure region 54 is depicted in FIG. 3. Likewise, the closure region 54 may be positioned on the inside of the closure flap 50 and brought into contact with an adhesive region 52 that is positioned at the exterior 56 of the outer layer 48.

In a relaxed, unfolded position (e.g., shown in FIG. 3), the closure flap 50 extends beyond the skirt region 36. However, the machine 16 is suited to inflate an inflatable web of cushioning material or the web 10 of inflatable pouches 12 if the skirt region 36 is exposed at the longitudinal edge 34*a*. Accordingly, the illustrated embodiment of roll 14 shows the closure flap 50 folded down in the direction of longitudinal edge 34*b* so that the skirt region 36 is exposed at the longitudinal edge 34*a*. In the rolled condition shown in FIG. 2, the skirt region 36 is exposed at a side or lateral face 60 of the cylinder formed by the roll 14.

Referring again to FIG. 1, web conveyance system 24 advances web 10 along path of travel 26 beside wall 20, with the web being oriented so that the first edge 34*a*, and particularly skirt region 36 is adjacent to the wall 20. Inflation system 28 is positioned to direct gas, as indicated by arrows 70, into the fill channel 46 as the web 10 is advanced along the path 26, thereby inflating the pouches 12. Sealing device 30 may be positioned just downstream of the inflation system 28 so that it substantially contemporaneously seals closed the skirt region 36 of the inner cushion structure 38 as they are being inflated. Sealing device 30 may seal closed the open skirt region 36 by producing a longitudinal seal 66 between film layers 44*a*, *b* and also intersects edge seals 62 near the first ends 34*a* thereof to enclose gas 70 within the inner cushion structure 38. In this manner, the inflatable pouches 12 of web 10 are converted into inflated pouches that are ready for shipping enclosed package.

In the presently-illustrated embodiment, the sealing device 30 and web conveyance system 24 are incorporated together as an integrated assembly, which may include a pair of convergent, counter-rotating rotary members, e.g., rollers 72, 74, and a sealing element 68 secured to at least one of the rollers, e.g., to roller 72 as shown in FIG. 1. Rollers 72, 74 may be positioned such that a nip, i.e., an area of tangential contact, is formed therebetween and operates to pull the web through the sealing device 30 along path 26. Simultaneous with such web conveyance, sealing element 68 forms longitudinal seal 66 at the nip between rollers 72, 74 to close the fill channel 46 formed by the open skirt region 36 as web 10 is advanced along path 26.

Sealing element 68 may be an electrically-heated resistive device, such as a band or wire, which generates heat when an electrical current passes through the device. Sealing element 68 may be mounted on the circumferential outer surface of roller 72 so that it rotates against the web 10 along with the roller 72. When sealing element 68 is mounted on roller 72 as presently illustrated, roller 72 may be considered a "sealing roller" while roller 74 is considered a "backing roller." When heated, the rotational contact between sealing element 68 and the open skirt region 36, as rollers 72, 74 counter-rotate compressively against skirt region 36 forms the longitudinal seal 66 as the web 10 is conveyed along its path of travel 26. The skirt region 36 may show signs of an embossed or corrugated edge 67 that result from the counter-rotating rollers 72, 74.

Figures 4A, 4B, 4C, 4D:
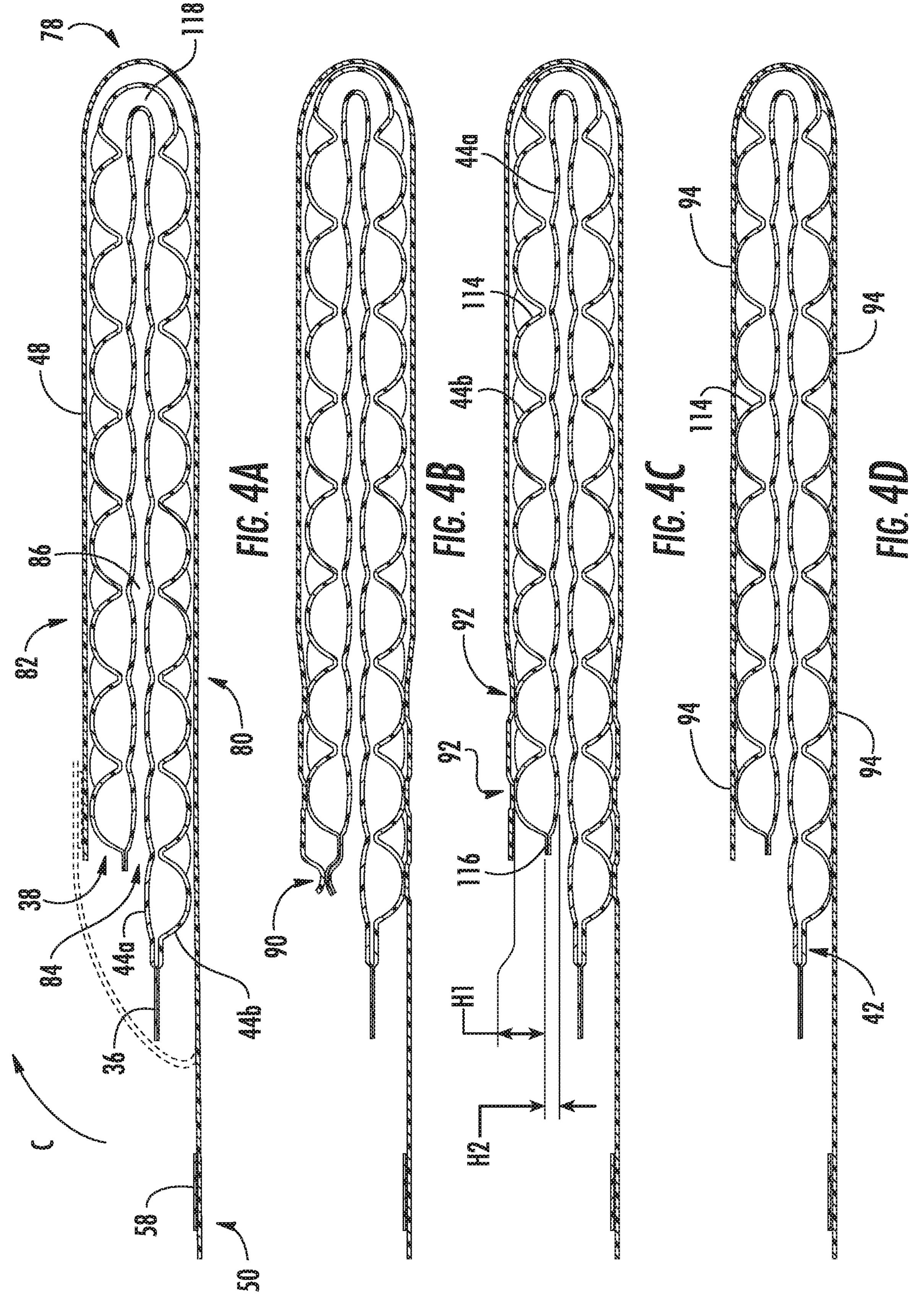
FIGS. 4A-4D are section views of different embodiments of the separated, inflated pouch of FIG. 3 in accordance with some embodiments of the present disclosure.

FIG. 4A depicts a cross section view of an embodiment of an inflated and separated pouch 12 as illustrated in FIG. 3. This cross section view shows that the pouches 12 are formed from a joined outer layer 48 and inner structure 38 that are folded at a bottom end 78 of the pouch to form a first panel 80 and a second panel 82. The first and second panels 80, 82 thus form an interior space 86 suitable for holding and protecting objects during shipment. Objects can be inserted into the interior space 86 through a pouch opening 84.

In the embodiment shown in FIGS. 3 and 4A, the outer layer 48 is secured to the inner structure 38 at edge seals 62, and not necessarily at points in between. For instance, FIG. 3 shows an opening 88 between the outer layer 48 and the inner structure 38 at the top of the second panel 82. In some instances, end-users attempting to insert packages into the pouch opening 84 may inadvertently insert the package into the opening 88. In order to reduce or eliminate this possibility, the outer layer 48 and inner structure 38 may be attached or tacked together at the top of the second panel 82. In one embodiment, shown in FIG. 4B, the outer layer 48 may be secured, at one or more attachment points 90 at the top of second panel 82, to the layers 44*a,* 44*b* of the inner structure 38. In one embodiment shown in FIG. 4C, the outer layer 48 may be secured, at one or more attachment points 92 near the top of second panel 82, to layer 44*b* of the inner structure 38. In one embodiment, layer 44*b* is a thermoformed layer and outer layer 48 is secured to the peaks or crowns, of bubbles 114 for example, of the thermoformed layer. In another embodiment shown in FIG. 4D, the outer layer 48 may be secured, at one or more attachment points 94 to layer 44*b* of the inner structure 38 at a plurality of points in the first panel 80 and the second panel 82. In this embodiment, layer 44*b* may be a thermoformed layer and outer layer 48 can be secured to the peaks or crowns, of bubbles 114 for example, of the thermoformed layer.

In some of the illustrated embodiments, the inner structure 38 comprises inner layer 44*a* that faces the interior space 86 and cushion layer 44*b* that faces the outer layer 48. In one or more embodiments, cushion layer 44*b* is thermoformed, such as by a representative process illustrated in FIG. 5. In this illustrated process, layers 44*a* and 44*b* are illustrated as films that are supplied from rolls 45*a* and 45*b*, respectively. Alternatively, the layers 44*a* and 44*b* may be formed in place by extrusion systems (not shown). Cushion layer 44*b* proceeds to guide rollers 96 to straighten, flatten, align, or in the case of extruded films, temper the film in preparation for delivery to forming drum 98. The forming drum 98 may be heated and maintained at a temperature sufficient to permit cushion layer 44*b* to (a) be thermoformed under the presence of a vacuum pressure that pulls the layer 44*b* into recesses 99, (b) bond with inner layer 44*a* under the influence of a pressure roller 100, and (c) release (i.e., without sticking) from the surface of the forming drum 98. Often, a relatively moderate temperature, e.g., around 100° F. to 120° F. (higher temperature for larger cell volume and/or thicker thermoformed films), will suffice for the foregoing purposes, depending on a number of factors, including the temperatures, the thicknesses, and compositions of the layers 44*a, b,* as may be readily and routinely determined by those having ordinary skill in the art of cellular cushioning manufacture.

Once the inner structure 38 is made at forming drum 98, the layers proceed to a cooling drum 102. Some residual air or gas may remain in the inner structure 38 and, in at least one embodiment, the inflated or partially inflated inner structure can be rolled up for later production of the mailer pouches. However, in the illustrated embodiment, the inner structure 38 can be deflated by cutting or slitting open the skirt region 36 with a blade 104, where resistance is provided by a backing roller 106 or other surface. Once the skirt region 36 is opened, the inner structure 38 may be deflated over one or more deflation rollers 108 or other deflation zone 109, which may include a sequence of rollers, compression plates, or other mechanical components that apply pressure to the inner structure 38 to remove much of the air or gas that is retained as part of the forming process. Lastly, under the influence of a tension roller 110, the deflated inner structure can be gathered, such as in a roll 112 for later production of the mailer pouches.

Figure 5:
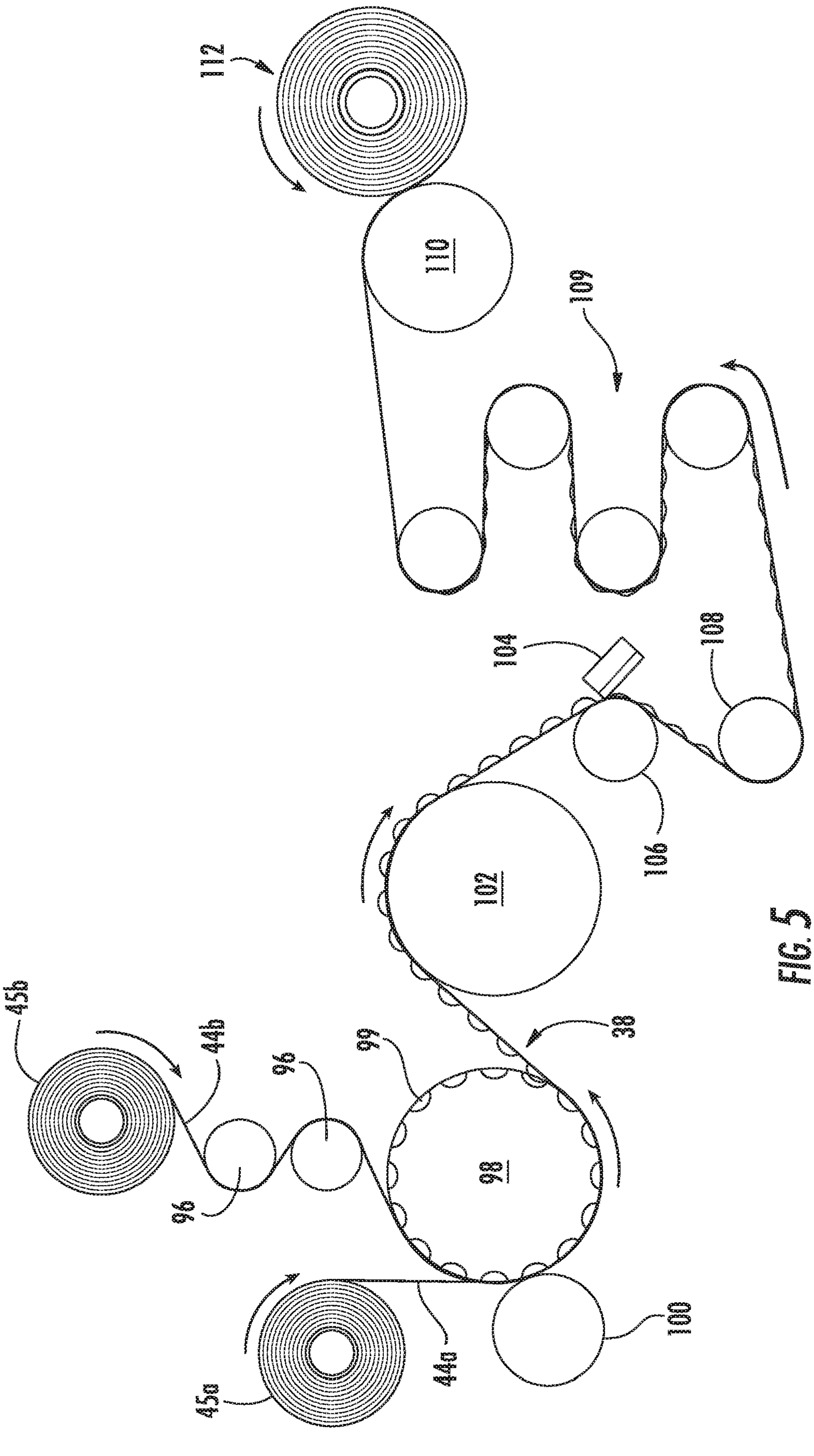
FIG. 5 is a schematic process diagram illustrating a method of forming an inner cushion structure of an inflatable pouch in accordance with some embodiments of the present disclosure.

With the inner structure formed as illustrated in FIG. 5, cushion layer 44*b* is thermoformed and includes a cushion structure with bubbles 114 or other shaped protrusions and inflation channels 42. As FIG. 4C shows, the cushion layer 44*b*, and specifically the bubbles 114 have a first height H1 above the interface 116 at which the layers 44*a,* 44*b* are sealed. The inner layer 44*a* is not thermoformed per se, but the otherwise flat layer may have some residual deformation caused by the forming process and as a result of heated air or gas being trapped in the bubbles 114 while the layers 44*a,* 44*b* are sealed to one another over the heated forming drum 98. Consequently, FIG. 4C also shows that the inner layer 44*a* has a second height H2 above the interface 116 at which the layers 44*a,* 44*b* are sealed. In the illustrated embodiment, the first height H1 of the thermoformed cushion layer 44*b* is greater than the second height of the inner layer 44*a*. Moreover, since the inner layer 44*a* has a smoother, less corrugated shape, the pouches 12 may be intentionally formed so that the inner layer 44*a* faces the interior space 86. This can be done to make it easier to place packages into the pouches 12 and reduce the likelihood that pointed or sharpened features of packages catch or grab onto the bubbles 114 or inflation channels 42 and potentially puncture the inner structure 38.

Figure 6:
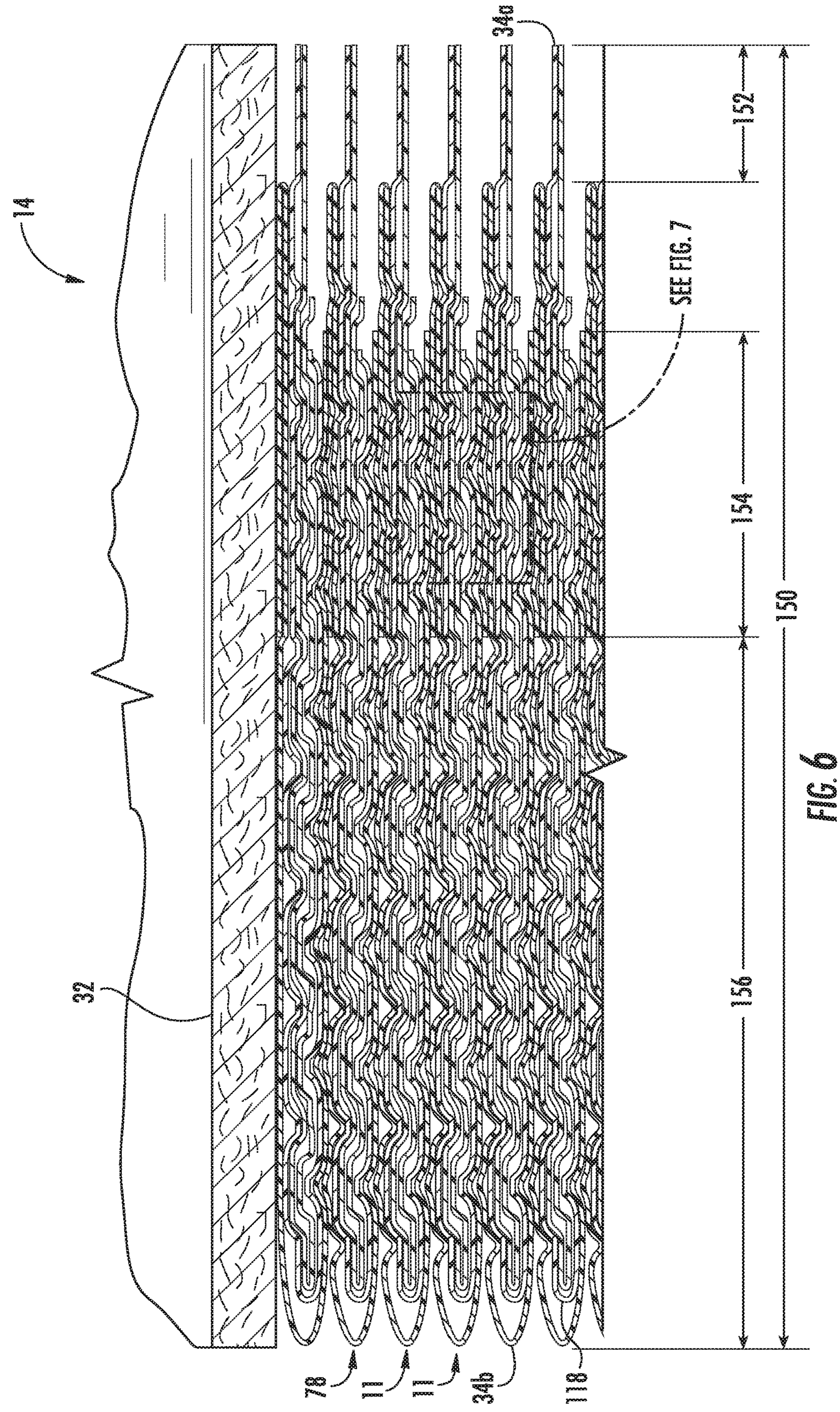
FIG. 6 is a partial section view of the rolled web of FIG. 2 in accordance with some embodiments of the present disclosure.
Figure 7:
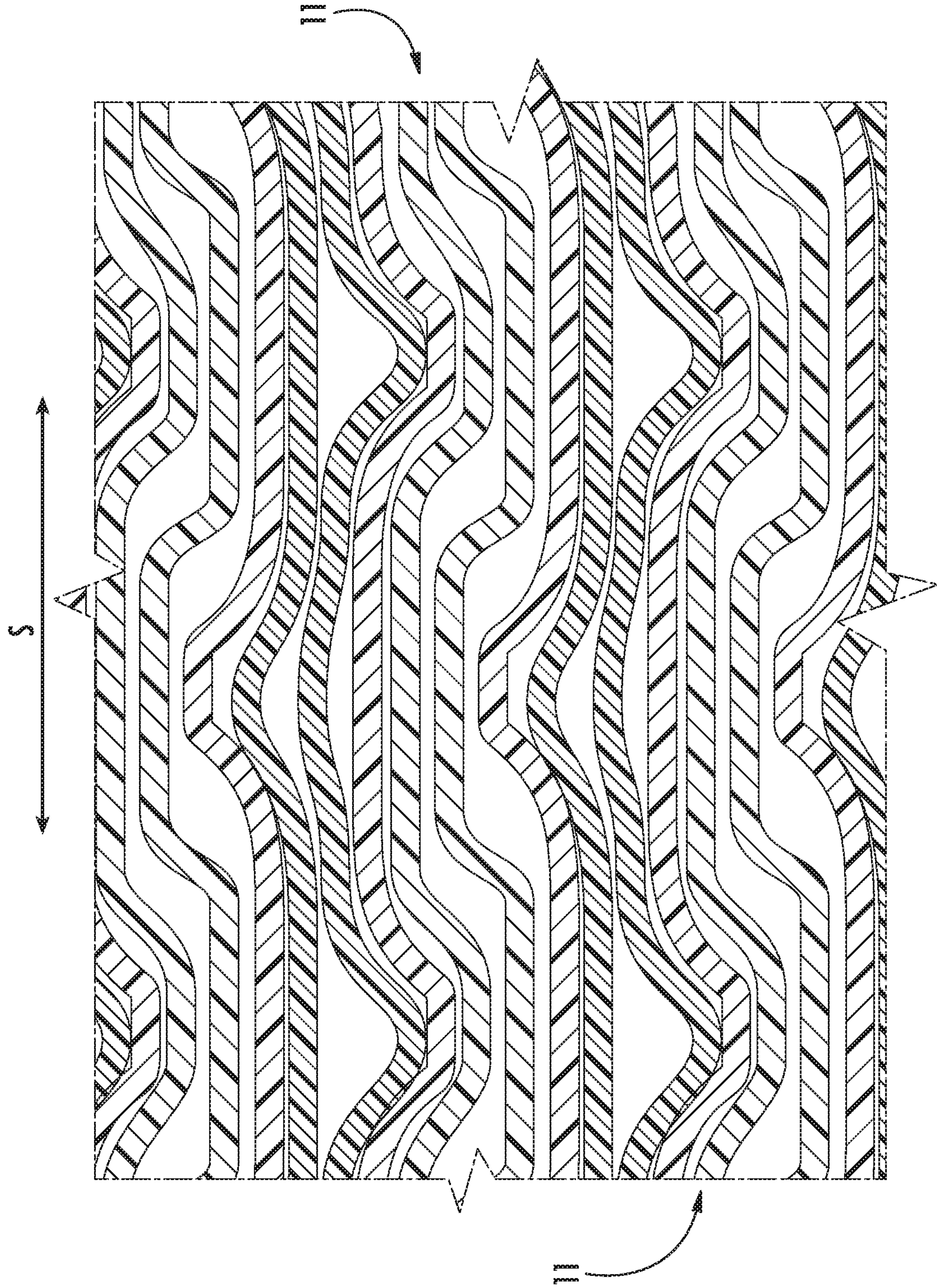
FIG. 7 is detail view of the cross section of FIG. 6 in accordance with some embodiments of the present disclosure.

FIG. 6 illustrates a partial section view of the roll 14 of layers 11 of deflated pouches taken along the section lines shown in FIG. 2. FIG. 7 shows a detail view of some of the layers 11 of roll 14 in FIG. 6. In particular, because some of the layers of inner structure 38 include plastically deformed thermoformed bubbles 114, the inner structure retains some of its height, even when deflated. That is, even with the inner structure 38 deflated, some of the inflation channels 42 and bubbles 114 retain a small volume of air 70. This retained height and retained air 70 offers advantages for embodiments of the rolled pouches 14 described herein.

A first advantage is that the thermoformed inflation channels 42 and bubbles 114 do not completely collapse and pinch off airflow channels at the second longitudinal edge 34*b* corresponding to the bottom 78 of the pouches 12, where the pouch panels 80, 82 are folded towards each other. As FIGS. 1, 4A, and 6 illustrate, air 70 initially enters the skirt region 36 and moves within the inflation channels 42 through the first panel 80 towards the second longitudinal edge 34*b*. At the second longitudinal edge 34*b,* air travels around a bend 118 in the inner structure 38 and into the second panel 82 to sufficiently fill the inner structure 38. Since this bend 118 is not pinched off and some small air flow channels remain, the pouches 12 can be filled at a faster rate. In fact, experiments have shown that compared to inner structures 38 formed of non-thermoformed inflation channels 42 and bubbles 114 where the bend 118 may be pinched, the pouches 12 with thermoformed inner structures 38 can be filled at least three times faster. This faster fill rate means that the speed at which the conveyance system 24 conveys the inflatable web 10 along the path of travel 26 can also be increased.

A second advantage is illustrated in FIG. 7 and shows that the thermoformed structures of adjacent layers 11 tend to engage one another and interlock the layers. With non-thermoformed inner structures 38, and during handling or transportation, the layers 11 tend to slip in the direction of arrow S in FIG. 7, which may cause the roll 14 to unwind and/or telescope. By comparison, rolls 14 comprising at least one thermoformed layer in inner structure 38 tend to retain their shape, even during handling and transportation.

A third advantage of the thermoformed layer(s) in inner structure 38 is that the retained height and retained air 70 in the inner structure 38 of the individual layers 11 are forgiving of variations in material thicknesses. This ability inner structure 38 to compress allows the pouch layers 11 on the roll 14 to have a non-uniform thickness across a width 150 of the pouch layers 11 without the roll 14 telescoping and/or unraveling after the roll 14 is wound. As can be seen in FIG. 6, the cross-sectional thickness of each of the individual pouch layers 11 varies across the width 150 of the pouch layers 11. In one example, the thinnest region 152 of each of the individual pouch layers 11 nearest the longitudinal edge 34*a* includes two total layers—the two layers 44*a*, 44*b* that form an 'open skirt' region 36. In another example, thickest region 154 across the width 150 of the pouch layers 11 extends between the bottom of the closure flap 50, which has been folded downward towards the second longitudinal edge 34*b* to expose the skirt region 36 in FIG. 6, and the top of the second panel 82. The thickest region 152 of each of the individual pouch layers 11 includes seven layers—the second panel 82, the layers 44*a*, 44*b* that form one side of the inner structure 38, the layers 44*a*, 44*b* that form the other side of the inner structure 38, the first panel 80, and the folded back closure flap 50. The other regions of the pouch layers 11 include varying thicknesses (e.g., varying numbers of layers) across the width 150 of the pouch layers 11. Because of the varying thicknesses across the width 150 of the pouch layers, it would be expected that the roll 14 would telescope and/or unravel after it is rolled and/or as the roll 14 is unwound. However, because the inner structure 38 is able to compress in the thickest region 154 and other regions of the roll 14 to prevent any telescoping and/or unraveling of the roll 14.

In some embodiments, the width of the thickest portion 154 is less than or equal to about at least one of 50% of the width 150 of the pouch layers 11, 25% of the width 150 of the pouch layers 11, or 10% of the width 150 of the pouch layers 11. Even though it would be expected that the roll 14 would telescope or unravel when the thickest portion 154 is less than half or the width 150 of the pouch layers 11, the ability of the inner structure 38 to compress prevents the roll 14 from telescoping and/or unraveling. In some embodiments, the distance 156 from the folded bottom edge of the pouch layers 11 to the thickest region 154 is greater than or equal to at least one of 25% of the width 150 of the pouch layers 11, 40% of the width 150 of the pouch layers 11, or 50% of the width 150 of the pouch layers 11. In some embodiments, the location of the thickest region 154 away from the folded bottom edge of the pouch layers 11 increases the ability of air to travel around the bend 118 in the inner structure 38 during inflation as the air sufficiently fills the inner structure 38. While the examples of the thicknesses of regions of the pouch layers 11 are described above as a number of film layers, a thickness layer of a pouch layer can be determined based on a number of film layers and paper layers, a number of film layers, paper layers, and adhesive layers, a sum of widths of individual layers, or any other method of determining a thickness of the pouch layers.

In some embodiments, the inner structure 38 is able to compress by an amount sufficient to keep the roll 14 substantially cylindrical. FIG. 2 shows a roll diameter dimension ØD with an associated cylindricity tolerance of "CYL". As used herein, the term cylindricity describes how close an object conforms to a true cylinder. In other words, cylindricity controls the form of a cylindrical feature, here the pouch roll 14, to ensure that it is desirably round and straight about its axis of rotation. This type of control is desirable because the roll 14 rotates as the machine 16 conveys the inflatable web 10 to fill the pouches 12. Experiments have shown that a loose cylindricity tolerance tends to produce an uncontrolled unwinding of the roll 14 during the fill process. In extreme cases, the roll 14 may tend to telescope and unravel on the spool 22. In some embodiments where the roll 14 is loosely wrapped, a cylindricity tolerance of less than 1 inch is sufficient. In other embodiments, where the inner structure 38 is more completely deflated and the roll 14 is more tightly wound, a cylindricity tolerance of less than half an inch is sufficient. These cylindricity tolerances may be appropriate for a roll with a diameter of less than about 15 inches.

Figure 8:
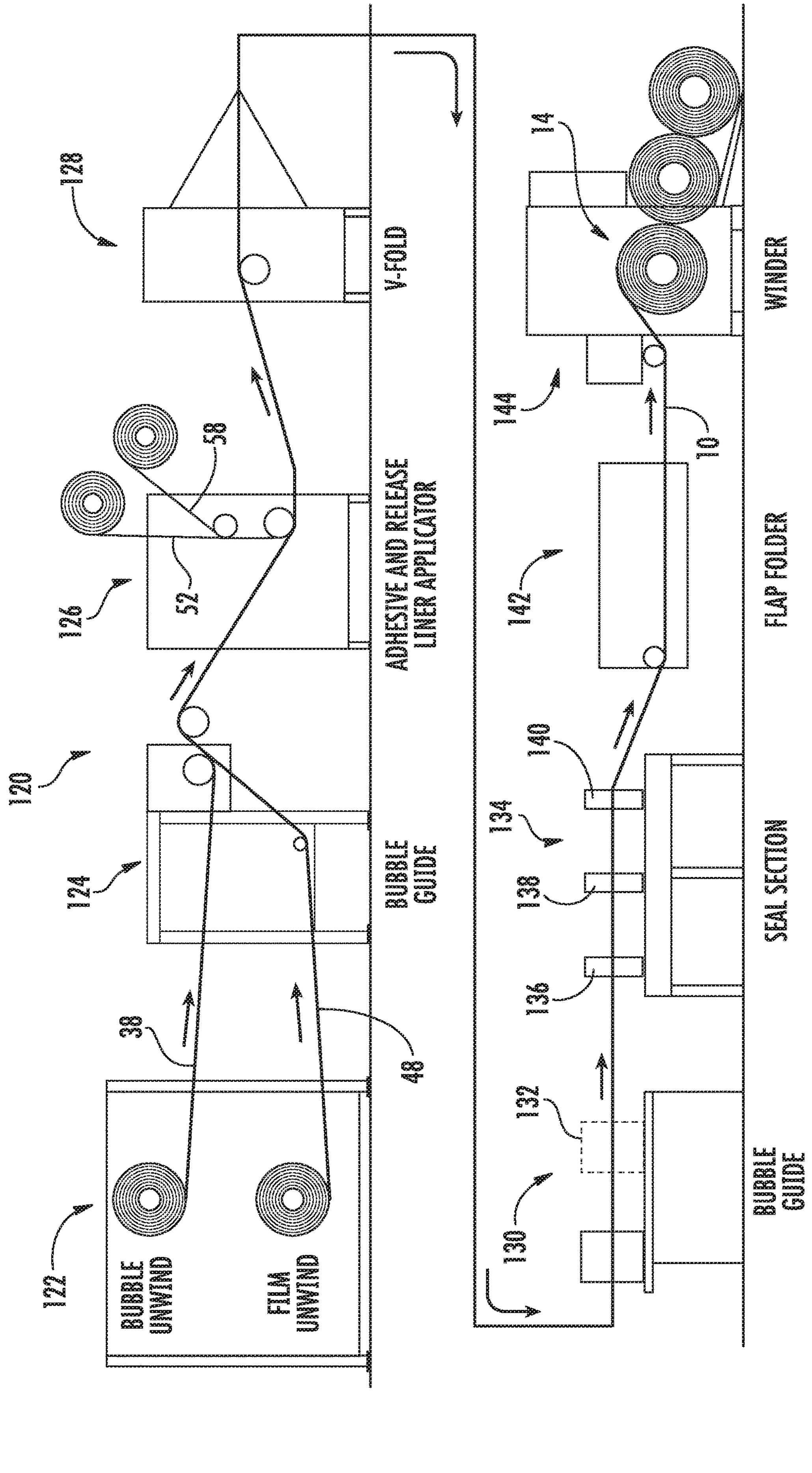
FIG. 8 is a schematic process diagram illustrating a method of forming a rolled web having a series of inflatable pouches in accordance with some embodiments of the present disclosure.

FIGS. 8 and 10A-10E illustrate a schematic representation of a manufacturing line 120 and associated process for making a web 10 of separable, inflatable pouches 12 in the form of a roll 14. At a supply station 122, separate rolls of outer layer 48 material, such as roll of opaque film, and inner structure 38, such as a deflated inner structure roll 112 formed as shown in FIG. 5, are supplied to the line 120. At a next joining station 124, the inner structure 38 and the outer film 48 are brought into contact with each other so that the skirt region 36 (i.e., fill channel 46) is disposed laterally inward, as indicated by arrow L1 in FIG. 10B, from the closure flap 50. In one embodiment, the inner structure 38 is positioned so that the thermoformed layer 44*b* faces the outer layer 48. At a next adhesive applicator station 126, and adhesive region 52 and associated release liner 58 is applied to the closure flap 50 (see FIG. 10C). The embodiment illustrated in FIG. 8 depicts the adhesive as a film supplied from a roll, but those skilled in the art will appreciate a variety of ways in which adhesive may be applied to the closure flap 50. For example, the adhesive may be applied in the form of a liquid, a tape, solvent-free adhesive applicators. Alternatively, the adhesive 52 and release liner 58 may be pre-formed and applied to the closure flap 50 from a single supply source (e.g., a single supply roll).

Figure 10A:
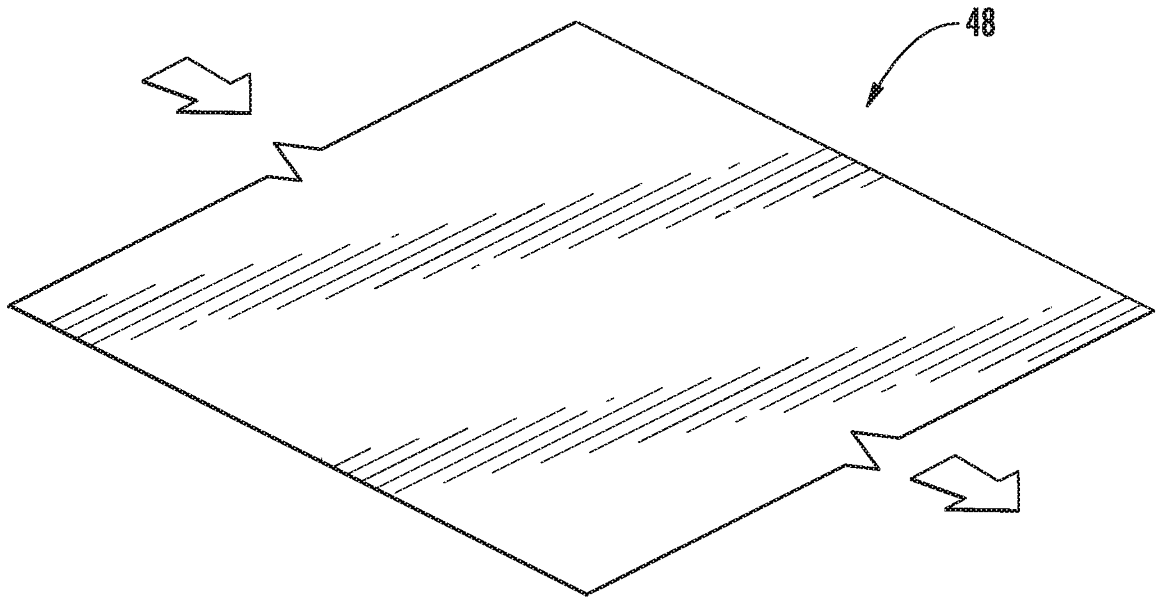
FIGS. 10A-10E depict perspective views illustrating representative steps in a method of forming a rolled web having a series of inflatable pouches in accordance with some embodiments of the present disclosure.
Figure 10B:
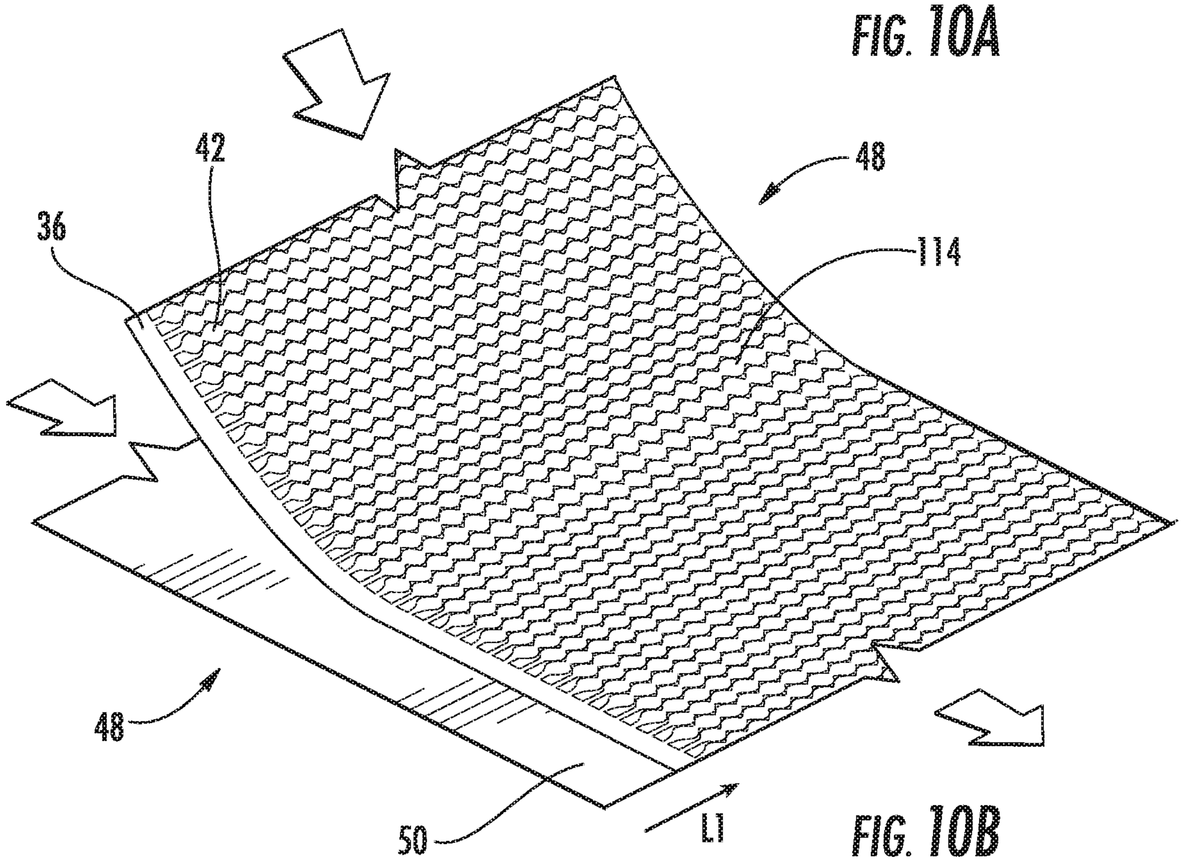
Figure 10C:
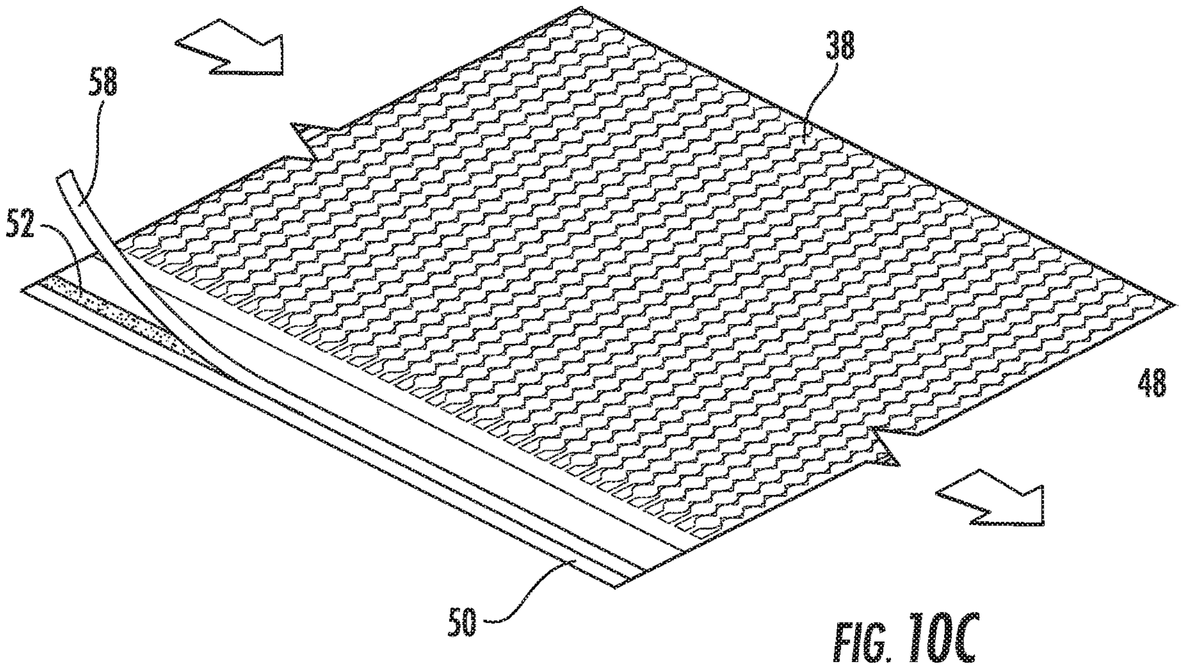
Figure 10D:
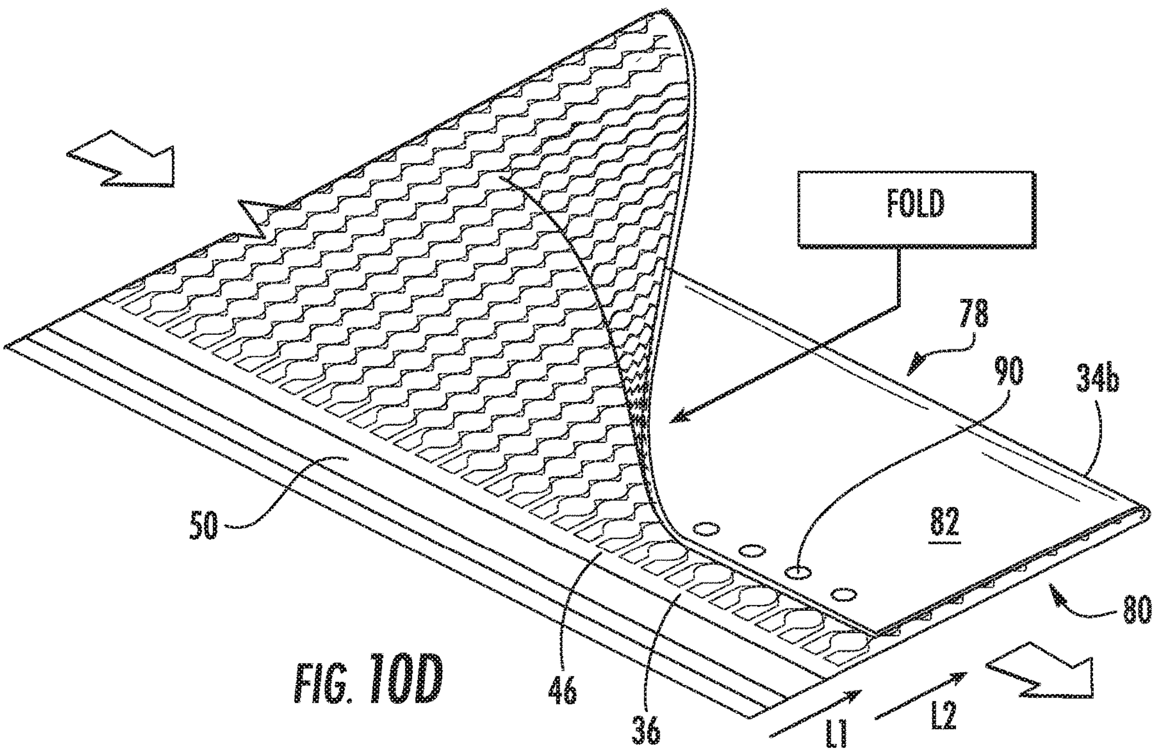
Figure 10E:
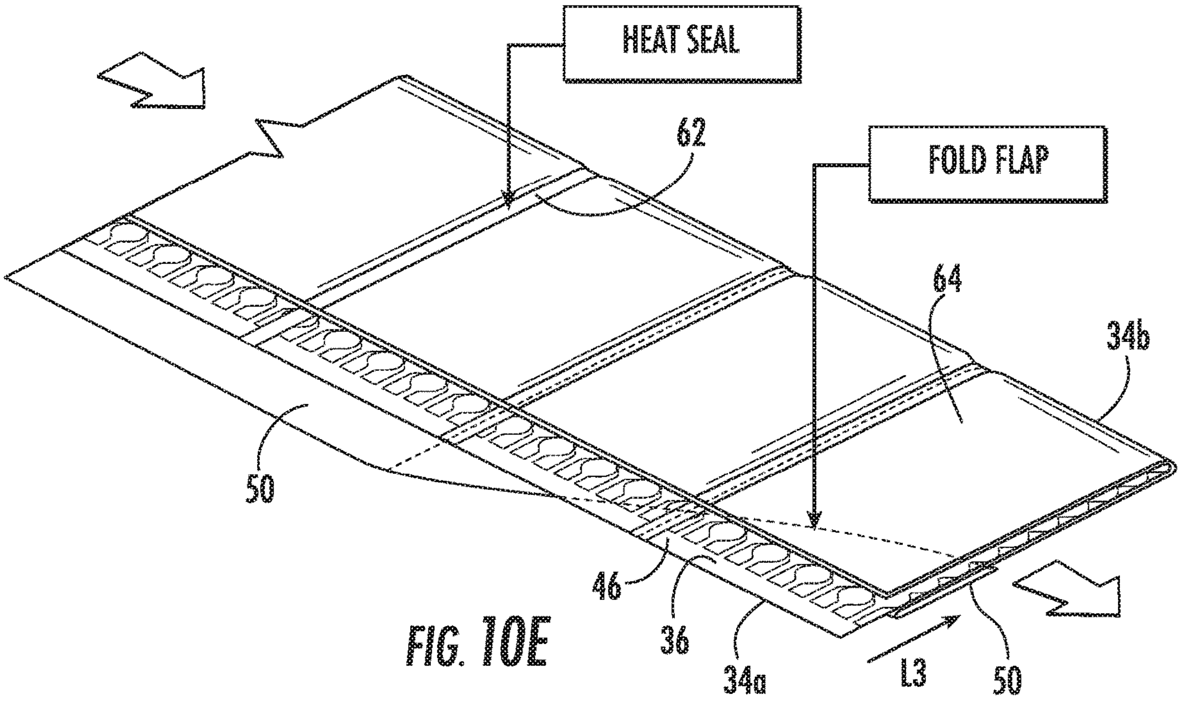

Next, at folding station 128, the outer layer 48 and inner structure 38 are folded as illustrated in FIG. 10D. Specifically, the outer layer 48 and inner structure 38 are folded at a bottom 78, thus forming the second longitudinal edge 34*b* of the web 10. Folding the films in this manner also forms the first panel 80 comprising the skirt region 36 and the closure flap 50 and a second panel 82 extending from the bottom 78 towards, but laterally inward of the skirt region 36 and fill channel 46 as indicated by arrow L2 in FIG. 10D. At this point, the folded material is guided by forwarding station 130, ensuring that the panels are sized and positioned as desired. Optionally at a tacking station 132, the outer layer 48 and inner structure 38 may be sealed to each other at one or more attachment points 90 at the top of second panel 82. The attachment points 90 may be discrete points as illustrated in FIG. 10D or a continuous longitudinal seal at the top of the second panel 82. Next, the folded material approaches the sealing station 134, including a sealer 136 that forms lateral seals 62, a cooler 138 to cool and set the seals 62, and a perforation blade 140 to form perforations 64 in the web 10. Subsequently, at flap folding station 142, the closure flap 50 is folded in the direction of the second longitudinal edge 34*b* so that the closure flap 50 is disposed laterally inward (indicated by arrow L3 in FIG. 10E) and exposes the skirt region 36 and fill channel 46 for filling and sealing by machine 16 for example. Lastly, at winding station 144, the web 10 of individual pouches 12 are wound into a cylindrical roll 14 with the closure flap 50 folded and with the fill channel 46 disposed at a lateral face 60 of the cylinder as shown in FIG. 2.

Figure 9:
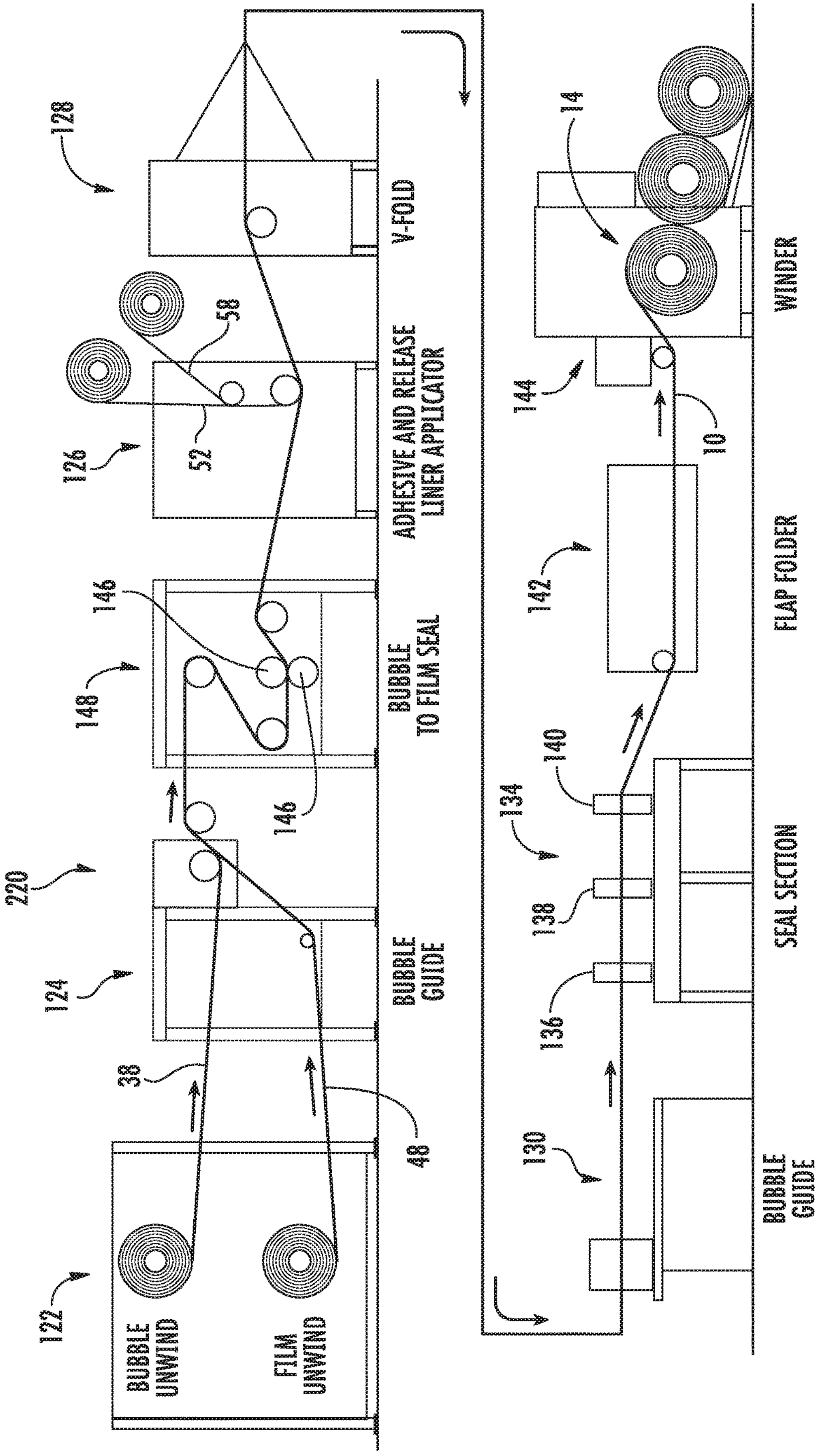
FIG. 9 is a schematic process diagram illustrating a method of forming a rolled web having a series of inflatable pouches in accordance with some embodiments of the present disclosure.
Figure 11:
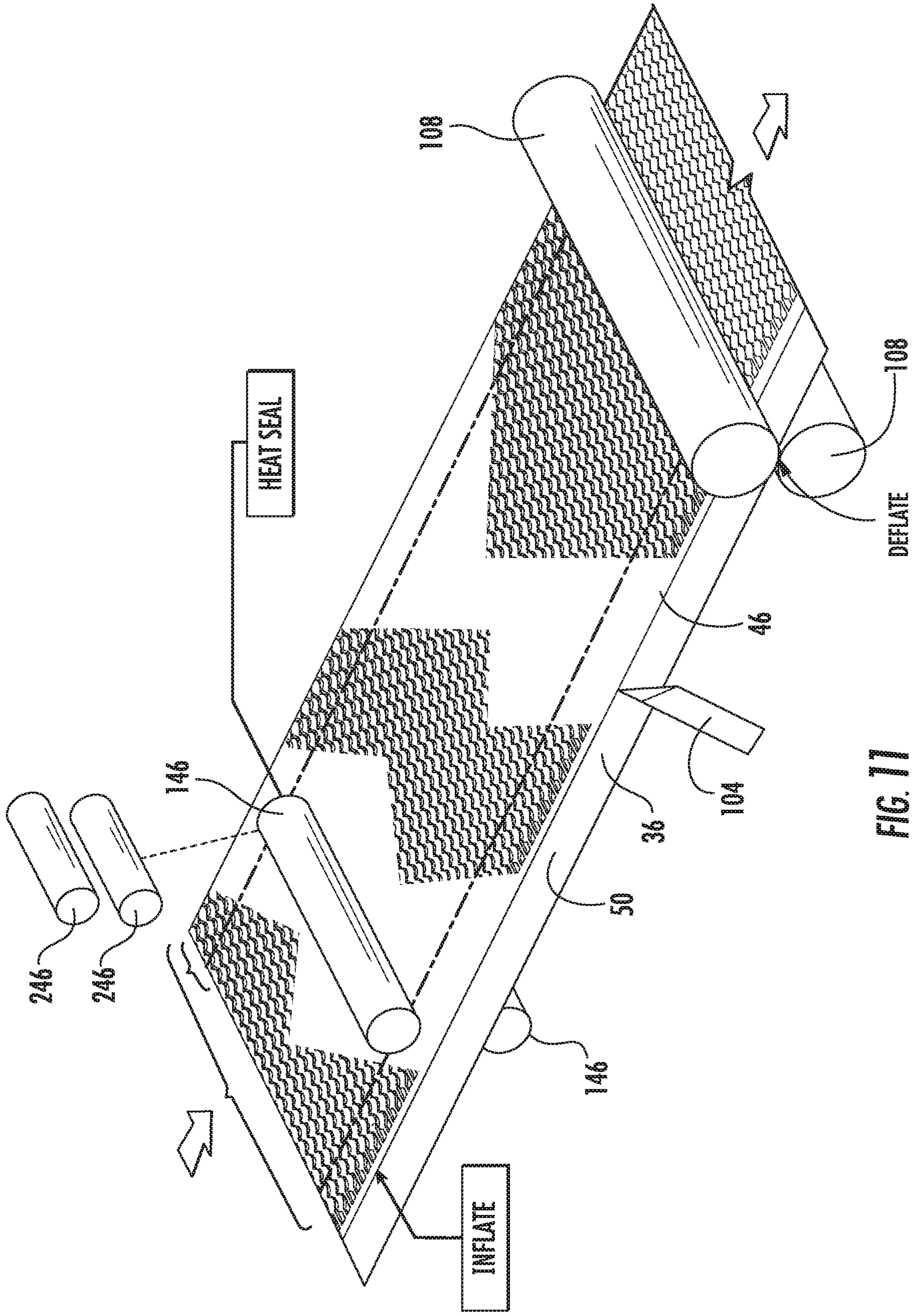
FIG. 11 depicts a perspective views illustrating representative steps in a method of forming a rolled web having a series of inflatable pouches in accordance with some embodiments of the present disclosure.

FIGS. 9 and 11 illustrate an alternative embodiment of a manufacturing line 220 and associated process for making a web 10 of separable, inflatable pouches 12 in the form of a roll 14. In these embodiments, reference is made to the pouch cross sections shown in FIGS. 4C and 4D, where the outer layer 48 is secured at one or more locations 92 or 94 to the crowns or peaks of individual bubbles 114 of the inner structure 38. Specifically, FIG. 9 shows a line 220 modified from the line 120 illustrated in FIG. 8 to include a layer sealing station 148 between the joining station 124 and adhesive applicator station 126. FIG. 11 depicts associated processes for sealing the outer layer 48 to the inner structure 38. On the manufacturing line 120, the outer layer 48 and inner structure 38 are joined at the joining station 124 as described above and proceed to the layer sealing station 148. In one embodiment, the inner structure 38 is temporarily inflated. Inflation can be performed by a machine 16 or other suitable equipment known in the art. Alternatively, the inner structure 38 may be formed as shown in FIG. 5 and described above, but without the steps of cutting the fill channel 46 and deflating the inner structure 38. Thus, a previously, yet temporarily, inflated inner structure 38 can be fed to the manufacturing line 220 to manufacture the web 10 of pouches 12.

Next, the outer layer 48 and inner structure 38 are passed between a pair of spaced nip rollers 146, at least one of which is heated to a temperature sufficient to bond outer layer 48 to the cushion layer **44*b* of the inner structure 38. The nip rollers 146 are preferably spaced so that the inner structure 38 is not compressed to the point of deforming or bursting. In one embodiment, the outer layer 48 can be secured to the peaks or crowns, of bubbles 114 for example, of the thermoformed cushion layer 44*b*. In the embodiment shown in FIG. 4D, the outer layer 48 may be secured, at one or more attachment points 94 to layer 44*b* of the inner structure 38 at a plurality of points over a substantial portion of the pouches 12, including on each of the first and second panels 80, 82. In such an embodiment, the spaced apart nip rollers 146 extend over a substantial portion of the inner structure 38 so that many or most of the individual bubbles 114 of the inner structure are bonded to the outer layer 48. In another embodiment, the outer layer 48 can be secured to the peaks or crowns, of bubbles 114 for example, of the thermoformed cushion layer 44*b* as shown in FIG. 4C. That is, the outer layer 48 is bonded at one or more attachment points 92 near the top of second panel 82, to layer 44*b* of the inner structure 38. In such an embodiment, the spaced apart nip rollers 246 extend over a smaller portion of the inner structure 38 at a lateral side opposite the closure flap 50 and fill channel 46 so that a smaller percentage of the individual bubbles 114 of the inner structure are bonded to the outer layer 48**.

In either case, after the outer layer 48 is bonded to the inner structure 38, the joined layers may be cooled as described above (though not specifically shown in FIG. 11). Ultimately, the skirt region 36 and fill channel 46 are opened, such as with a blade 104, and the inner structure 38 is deflated with deflation rollers 108 or a deflation zone 109 as shown in FIG. 5 and described above.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

While the foregoing written description of the presently-disclosed embodiments enables one of ordinary skill to make and use what is considered presently to be the best mode thereof, those of ordinary skill will understand and appreciate the existence of variations, combinations, and equivalents of the specific embodiment, method, and examples herein. For example, while the closure flap 50 and fill channel 46 are described herein as being part of the first panel 80 of the pouches 12, in alternative embodiments, the closure flap 50 or the fill channel 46 or both may be disposed at the top of the second panel 82. In any event, the fill channel 46 is preferably exposed at a lateral face of a cylindrical roll 14 of a web 10 of pouches 12. The claimed subject matter should therefore not be limited by the above described embodiment, method, and examples, but by all embodiments and methods within the scope and spirit of the claimed subject matter.

What is claimed is:

1. A cylinder roll of preformed mailer pouches comprising wound pouch layers, each pouch layer comprising adjoining individual mailer pouches, each pouch layer comprising:
- an inflatable inner cushion structure comprising:
  - a plurality of layers; and
  - a fill channel connected to a plurality of inflatable compartments in the inner cushion structure, the inner cushion structure being in a deflated state on the roll; and
- an outer layer secured to the inner cushion structure, the outer layer comprising a closure flap;
- wherein the inner cushion structure and outer layer are folded at a bottom edge of the pouch layer to form a first panel of the pouches and a second panel of the pouches, the fill channel being disposed at a top of the first panel and the closure flap being disposed at a top of either the first or the second panel, the fill channel extending a first distance beyond a top of the second panel and the closure flap extendable a second distance beyond the top of the fill channel, the closure flap being folded towards the bottom edge so that the fill channel of each pouch layer is exposed at a lateral face of the cylinder.

2. The roll of claim 1 wherein the inflatable inner cushion structure comprises at least one thermoformed layer.

3. The roll of claim 2 wherein the outer layer is secured to the thermoformed layer.

4. The roll of claim 1 wherein first and second panels define an opening to a product volume that is disposed between the panels and the fill channel is disposed at the top of the first panel closest to the opening and the closure flap is disposed at the top of the first panel opposite the opening.

5. The roll of claim 1 further comprising a plurality of perforated lateral seals securing the first and second panels, extending from the fold towards the fill channel and defining lateral sides of individual mailer pouches.

6. The roll of claim 1 further comprising an adhesive region to secure the closure flap to an exterior of the mailer pouches and wherein the adhesive region is disposed on the closure flap.

7. The roll of claim 1, wherein each of the pouch layers includes a thickest region within a width of the pouch layer and wherein a width of the thickest region is less than or equal to at least one of 50% of the width of the pouch layer, 25% of the width of the pouch layer, or 10% of the width of the pouch layer.

8. The roll of claim 1, wherein each of the pouch layers includes a thickest region within a width of the pouch layer and wherein a distance between the folded bottom edge of the pouch layer to the thickest region is greater than or equal to at least one of 25% of the width of the pouch layer, 40% of the width of the pouch layer, or 50% of the width of the pouch layer.

9. The roll of claim 1, wherein each of the pouch layers includes a thickest region within a width of the pouch layer and wherein the thickest region is determined based on at least one of a number of film layers, a number of film layers and paper layers, a number of film, paper, and adhesive layers, or a sum of thicknesses of individual layers.

10. A method of forming a roll of preformed pouches comprising:

providing a supply of a film structure comprising a plurality of layers, the film structure further comprising a plurality of inflatable compartments and a fill channel disposed at a first longitudinal edge of the film structure;

providing a supply of an outer film, the outer film comprising a closure flap disposed at a first longitudinal edge of the outer film;

guiding the film structure and the outer film into contact with each other so that the fill channel is disposed laterally inward from the closure flap;

applying a closure material to the closure flap;

folding the film structure and the outer film at a bottom edge to form a first panel comprising the fill channel and the closure flap and a second panel extending from the bottom edge towards but laterally inward of the fill channel;

transversely sealing the first panel to the second panel to create a web of individual pouches;

folding the closure flap to expose the fill channel and so that the closure flap is disposed laterally inward from the fill channel; and rolling the web of individual pouches into a cylindrical roll with the closure flap folded and with the fill channel disposed at a lateral face of the cylinder.

11. The method of claim 10, further comprising:

before the step of folding the film structure and the outer film, temporarily inflating the film structure;

heat sealing the outer film to the temporarily inflated film structure by passing the film structure and the outer film between spaced apart nip rollers, at least one of the nip rollers being heated; and deflating the film structure.

12. The method of claim 10, further comprising, after the step of folding the film structure and the outer film, at least partly sealing the outer film to the film structure at a top of the second panel.

13. The method of claim 10, further comprising perforating the web of individual pouches at a location where the first panel and the second panel are transversely sealed.

14. The method of claim 10 wherein the film structure comprises at least one thermoformed layer.

15. The method of claim 14 wherein the step of guiding the film structure and the outer film into contact with each other comprises guiding the outer layer into contact with the at least one thermoformed layer.

16. The method of claim 10 further comprising rolling the web of individual pouches into a cylindrical roll with the closure flap folded and disposed towards an exterior of the cylinder.

17. The method of claim 10, wherein each of the pouch layers includes a thickest region within a width of the pouch layer and wherein a width of the thickest region is less than or equal to at least one of 50% of the width of the pouch layer, 25% of the width of the pouch layer, or 10% of the width of the pouch layer.

18. The method of claim 10, wherein each of the pouch layers includes a thickest region within a width of the pouch layer and wherein a distance between the folded bottom edge of the pouch layer to the thickest region is greater than or equal to at least one of 25% of the width of the pouch layer, 40% of the width of the pouch layer, or 50% of the width of the pouch layer.

19. The method of claim 10, wherein each of the pouch layers includes a thickest region within a width of the pouch layer and wherein the thickest region is determined based on at least one of a number of film layers, a number of film layers and paper layers, a number of film, paper, and adhesive layers, or a sum of thicknesses of individual layers.

* * * * *